United States Patent [19]

Gregoire

[11] Patent Number: 5,762,103
[45] Date of Patent: Jun. 9, 1998

[54] TILTING O-RING CHECK VALVE

[75] Inventor: Roger Joseph Gregoire, Bulverde, Tex.

[73] Assignee: Advanced Pressure Technology, Inc., Napa, Calif.

[21] Appl. No.: 736,578

[22] Filed: Oct. 24, 1996

[51] Int. Cl.⁶ .................................................. F16R 15/14
[52] U.S. Cl. .................. 137/512.15; 137/860; 137/512.4
[58] Field of Search ........................... 137/512, 512.15, 137/516.19, 516.15, 860, 512.4

[56] References Cited

U.S. PATENT DOCUMENTS

| | | | |
|---|---|---|---|
| 1,366,151 | 1/1921 | Astrom | 137/860 |
| 2,671,466 | 3/1954 | Conrad | 137/512.4 X |
| 3,154,486 | 10/1964 | Weaver | 137/860 X |
| 3,298,394 | 1/1967 | Chorkey | 137/860 X |
| 3,363,644 | 1/1968 | Malec | 137/860 X |
| 3,511,271 | 5/1970 | Pollinger et al. | 137/860 X |
| 3,857,405 | 12/1974 | Heideman | 137/860 X |
| 4,214,607 | 7/1980 | Bouteille | 137/512.15 X |
| 4,237,935 | 12/1980 | Delmonte et al. | 137/860 |
| 4,549,565 | 10/1985 | Short, III | 137/860 X |
| 4,964,423 | 10/1990 | Gausman et al. | 137/543.17 |

*Primary Examiner*—John Rivell
*Attorney, Agent, or Firm*—Royston, Rayzor, Vickery, Novak & Druce, L.L.P.

[57] ABSTRACT

A check valve comprising of an inlet body portion, an outlet body portion, and a resilient o-ring. The o-ring being the only moveable part is slightly stretched and sealingly contacts the exterior corner edges of an annular groove. The annular groove corner edges are concentrically aligned and of distinctly different diameters. The inside diameter area of the o-ring communicates with an inlet passage through radial holes. Inlet pressure forces the o-ring to "tilt" off of the larger diameter groove edge by pivoting on the smaller diameter groove edge, thereby allowing fluid to flow from the inlet passage to an outlet passage.

7 Claims, 1 Drawing Sheet

TILTING O-RING CHECK VALVE

BACKGROUND—FIELD OF INVENTION

This invention relates in general to check valves and in particular to annular elastomeric seal check valves.

BACKGROUND—DESCRIPTION OF PRIOR ART

In fluid distribution systems, check valves are necessary to provide reverse flow protection or unidirectional flow. In high purity fluid distribution systems, these check valves are well known for their propensity to contaminate. The moving parts within a check valve are sources of particulate contamination, especially if they rub or contact other surfaces. Also, at certain pressure drops and flows, these moving parts can "chatter" (oscillate), thereby generating an enormous amount of particulate contamination. Typically, a check valve has three moving parts; a seal member, a valve member, and a biasing means (commonly a spring) to urge the valve to the normally closed position. As a check valve opens, its biasing force correspondingly increases, so that when the check valve is fully open, the biasing force is at its greatest value. Oscillations can occur during partial openings, such as in low flow conditions, as the biasing force increasingly resists the valve opening. As fluid flow passes across these moving parts, the shedding particles (contaminates) are entrained into the flow path and distributed downstream, thereby contaminating the system.

Prior art annular elastomeric seal type check valves such as U.S. Pat. Nos. 3,363,644, 4,549,565, and 4,237,935, have only one moving part. Although it is desirable to minimize the number of moving parts, this type of design has some disadvantages. In many fluid distribution systems, it is necessary that check valves be non restrictive to flow, and have good cracking pressure sensitivity, such as from 1 to 2 psi (pounds per square inch) cracking pressure. Prior art check valves of this design, not only have the above mentioned oscillation problem, but also are generally more restrictive to flow and have higher cracking pressures.

SUMMARY OF THE INVENTION

It is an object of the present invention to provide a check valve such that its biasing force decreases as the valve opens, thereby minimizing oscillation and its associated contamination.

It is another object of the invention to provide such a device with only one moving part, with improved flow capacity and cracking pressure sensitivity, thereby reducing the number of contamination sources without compromising performance.

It is a further object of the invention to provide such a device which is of simple and inexpensive construction.

The foregoing objects can be accomplished by utilizing an o-ring in a specially constructed annular groove, whereby the o-ring tilts on a pivot edge to open and close the check valve. The pressure actuated tilting action produces a decreasing biasing force as the valve opening increases. This biasing effect creates a snap action opening and closing, virtually eliminating valve oscillations. A less restrictive, higher capacity flow is an inherent benefit resulting from the snap action opening. The o-ring, being the only moving part within this new check valve, seals on two sharp line edges, thereby assuring good cracking pressure sensitivity. This new check valve consists of an inlet body portion, an outlet body portion, and a o-ring.

DESCRIPTION OF THE PREFERRED EMBODIMENTS

Figure 1:
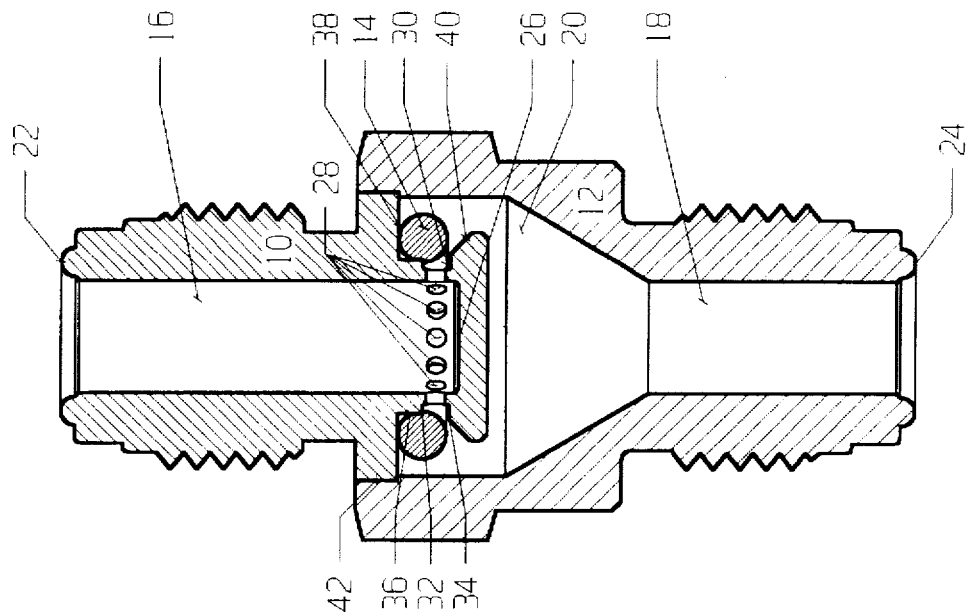
FIG. 1 is a cross sectional view, showing the new check valve in the normally closed position.

FIG. 1 shows a cross sectional view of the new check valve. The check valve consists of three parts, an inlet body portion 10, an outlet body portion 12, and an o-ring seal 14. Inlet body portion 10 sealingly attaches to outlet body portion 12 at junction 42, preferably by electron beam welding, although other methods would be acceptable. Outer ends 22, 24 of the respective inlet and outlet body portions, are connections to a fluid distribution system. These ends 22, 24 can be threaded, welded or of any other type of connection means. Inlet body portion 10 contains inlet passage 16 that ends at face 26. At inlet passage 16, near face 26, multiple radial holes 28 communicate inlet passage 16 to annular groove 30. O-ring 14 is slightly stretched and sealingly contacts on the exterior groove corner edges 32, 34, creating two sharp edge line seals. Groove width, being the distance between edge 32 and edge 34, is approximately one half the cross sectional diameter of o-ring 14. Diameter of groove corner edge 32 is concentric with, and is distinctly smaller than, diameter of groove corner edge 34. Annular groove 30 base diameter is smaller than inside diameter of o-ring 14. To enable good sealing characteristics, groove edges 32, 34 must be polished so that no non concentric scratches exist and its edge radius kept as small as possible. Cylindrical shoulder 36 extends from corner edge 32 to face 38. Shoulder 36 width, being the distance between edge 32 and face 38 at shoulder 36, is approximately one half of the cross sectional diameter of o-ring 14. Taper 40 extends outward and away from edge 34. Outlet body portion 12 contains outlet passage 18 that communicates with outlet cavity 20. O-ring 14 and annular groove 30 portion of inlet body are contained within outlet cavity 20.

FIG. 1 shows the check valve in the closed position. The amount of resilient force applied by o-ring 14 to groove edges 32, 34 determines initial biasing force and therefore cracking pressure. Using different size and type of o-rings can vary the cracking pressure. Fluid pressure within inlet passage 16 communicates through radial holes 28 into annular groove 30 to inside diameter area of o-ring 14. Inlet fluid pressure imposes an outward force on o-ring 14. Fluid pressure within outlet passage 18 communicates with outlet cavity 20. Outlet fluid pressure imposes an inward force on o-ring 14. Under high back pressure conditions, whereas outlet pressure exceeds inlet pressure, o-ring 14 seals tighter on groove edges 32, 34. Annular groove 30 depth is sufficiently shallow to prevent o-ring 14 from sticking into groove under high back pressure conditions.

Figure 2:
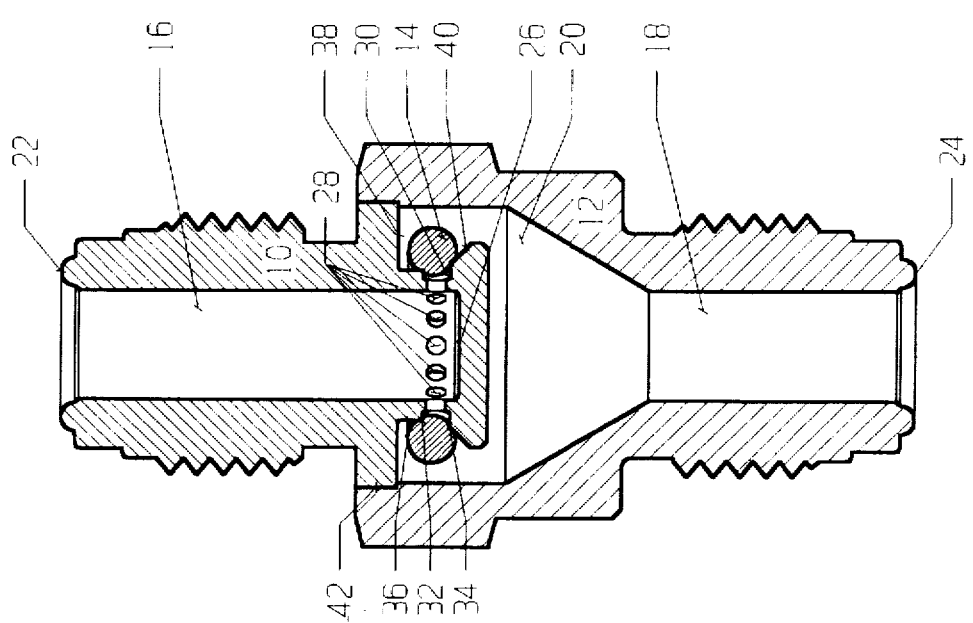
FIG. 2 is a cross sectional view, showing the new check valve in the open position, whereas the inlet pressure is greater than the outlet pressure.

FIG. 2 shows the check valve in the open position, whereas inlet pressure exceeds outlet pressure by an amount greater than the cracking pressure value, causing o-ring 14 to lift off of groove edge 34 by pivoting upward on edge 32. This allows fluid to flow from annular groove 30 through opening between o-ring 14 and groove edge 34, and into outlet cavity 20. Taper 40 assists in directing the fluid flow downward by way of "wall attachment" phenomena, and thereby minimizes turbulence and its associated resistance to flow. From the outlet cavity 20, fluid exits through outlet passageway 18. It is necessary for o-ring 14 to tilt upward towards face 38 to prevent the possibility of o-ring coming off during high flow conditions. To control the direction of tilt upwards, groove edge 32 is smaller in diameter than groove edge 34. The biasing force to return to the closed position, decreases as o-ring 14 tilts upward, shifting o-ring resilient forces to shoulder 36. Face 38, limits the amount of o-ring tilting, so as to maintain it in an unbalanced position to prevent a latched open condition.

What is claimed is:

1. A check valve assembly for limiting fluid flows to a single direction, comprising:

an inlet body portion having an inlet passage, said inlet passage terminating with a plurality of radially spaced holes;

an outlet body portion formed adjacent said inlet body portion, said outlet body portion having an outlet passage;

an annular groove formed exteriorly about said inlet body portion and facing said outlet body portion, said annular groove communicating with said inlet passage through said radially spaced holes, said annular groove having first and second sharp edge corners, said first sharp edge corner having a diameter distinctly less than the diameter of said second sharp edge corner;

a flexible, resilient o-ring, said o-ring adapted to sealingly engage said first and second sharp edge corners of said annular groove, thereby limiting fluid flows through the check valve assembly to a single direction originating in said inlet passage and terminating in said outlet passage; and a shoulder formed on said inlet body portion adjacent said first sharp edge corner, said shoulder being adapted to prevent said o-ring from disengaging from said first sharp edge corner as fluid flows from said inlet passage through said annular groove to said outlet passage.

2. The check valve assembly as recited in claim 1, further comprising:

a tapered surface extending outwardly away from said second sharp edge corner and toward said outlet passage, said tapered surface being adapted to create a wall attachment phenomenon in fluids flowing from said inlet passage into said outlet passage.

3. The check valve assembly as recited in claim 1, wherein:

said annular groove has a width substantially less than the cross-sectional diameter of said o-ring, such that said o-ring is prevented from lodging in said annular groove under back fluid pressure from said outlet passage.

4. The check valve assembly as recited in claim 1, wherein:

said shoulder has a width substantially less than said cross-sectional diameter of said o-ring, such that said o-ring is prevented from lodging against said shoulder under forward fluid pressure from said inlet passage.

5. The check valve assembly as recited in claim 4, wherein:

said annular groove has a width substantially less than the cross-sectional diameter of said o-ring, such that said o-ring is prevented from lodging in said annular groove under back fluid pressure from said outlet passage.

6. The check valve assembly as recited in claim 5, wherein said width of said annular groove and said width of said shoulder are each approximately one half said cross-sectional diameter of said o-ring.

7. The check valve assembly as recited in claim 5, further comprising:

a tapered surface extending outwardly away from said second sharp edge corner and toward said outlet passage, said tapered surface being adapted to create a wall attachment phenomenon in fluids flowing from said inlet passage into said outlet passage.

* * * * *